(12) United States Patent
Nimmo et al.

(10) Patent No.: US 7,788,006 B2
(45) Date of Patent: Aug. 31, 2010

(54) ROLLOVER STABILITY SYSTEM INCLUDING ALLOWANCE FOR THE STEERING ANGLE

(75) Inventors: Matthew Nimmo, Ludwigsburg (DE); Matthias Hey, Wuerzburg (DE); Christopher Dzumaryk, Milford, MI (US); Flavio Nardi, Farmington Hills, MI (US); Andris Samsons, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/992,258

(22) Filed: Nov. 18, 2004

(65) Prior Publication Data
US 2005/0143885 A1  Jun. 30, 2005

(30) Foreign Application Priority Data
Dec. 5, 2003  (DE) ............... 103 56 827

(51) Int. Cl.
*G06F 17/00* (2006.01)
*B60G 21/00* (2006.01)
*B60W 30/02* (2006.01)

(52) U.S. Cl. .............. 701/38; 701/39; 701/41; 701/70; 280/5.502; 280/5.503; 280/5.504; 280/5.505; 280/5.506; 280/5.507; 280/5.51; 180/197

(58) Field of Classification Search ........... 701/38, 701/39, 41, 70; 280/5.502–5.507, 5.51; 180/197
See application file for complete search history.

(56) References Cited

U.S. PATENT DOCUMENTS

| | | | |
|---|---|---|---|
| 5,485,417 A * | 1/1996 | Wolf et al. ............... 701/37 |
| 5,832,402 A * | 11/1998 | Brachert et al. .......... 701/72 |
| 6,088,637 A * | 7/2000 | Acker et al. ............. 701/38 |
| 6,104,284 A * | 8/2000 | Otsuka .................. 340/440 |
| 6,205,375 B1 * | 3/2001 | Naito ..................... 701/1 |
| 6,282,471 B1 * | 8/2001 | Burdock et al. .......... 701/38 |
| 6,349,247 B1 * | 2/2002 | Schramm et al. .......... 701/1 |
| 6,360,157 B1 * | 3/2002 | Hartmann ............... 701/70 |
| 6,424,907 B1 * | 7/2002 | Rieth et al. ............ 701/124 |
| 6,494,281 B1 * | 12/2002 | Faye et al. ............ 180/197 |
| 6,600,974 B1 * | 7/2003 | Traechtler ............... 701/1 |
| 6,604,035 B1 * | 8/2003 | Wetzel et al. ........... 701/38 |
| 6,701,276 B2 * | 3/2004 | Kueblbeck et al. ...... 702/145 |
| 6,799,092 B2 * | 9/2004 | Lu et al. ................. 701/1 |
| 6,819,980 B2 * | 11/2004 | Bauer et al. ............. 701/1 |
| 2002/0069006 A1 * | 6/2002 | Faye et al. ............. 701/70 |
| 2002/0116104 A1 * | 8/2002 | Kawashima et al. ....... 701/37 |
| 2003/0158636 A1 * | 8/2003 | Haas .................... 701/1 |
| 2004/0024509 A1 * | 2/2004 | Salib et al. ............ 701/45 |

FOREIGN PATENT DOCUMENTS

WO    WO-99/51475    * 10/1999

* cited by examiner

*Primary Examiner*—Jack Keith
*Assistant Examiner*—Chuong P Nguyen
(74) *Attorney, Agent, or Firm*—Kenyon & Kenyon LLP

(57) ABSTRACT

In a rollover stability method for a vehicle in a situation which is critical with respect to the driving dynamics, a critical rollover situation is detected by analyzing a control variable and the stabilization intervention is activated or de-activated as a function of the control variable. The regulation intervention is maintained even in driving situations featuring relatively low transverse acceleration if the control variable or a characteristic property of the stability algorithm is calculated as a function of the steering angle and/or the longitudinal vehicle velocity.

6 Claims, 1 Drawing Sheet

ROLLOVER STABILITY SYSTEM INCLUDING ALLOWANCE FOR THE STEERING ANGLE

FIELD OF THE INVENTION

The present invention relates to a method for rollover stabilization of a vehicle in a critical driving situation and a corresponding electronic stability program.

BACKGROUND INFORMATION

Vehicles having a high center of gravity, such as minivans, SUVs (sport utility vehicles), or delivery vans, tend to roll over about their longitudinal axes when subjected to high transverse acceleration while traveling along a curve. Therefore, rollover stability systems, such as ROM (rollover mitigation), are often used in such vehicles to stabilize the vehicle in situations which are critical with respect to the driving dynamics and reduce the tipping motion of the vehicle about its longitudinal axis. An electronic stability program having a ROM function, known from the related art, is illustrated as an example in FIG. 1.

FIG. 1 shows a highly simplified schematic block diagram of a known ROM system, which essentially includes a control unit 1 having a ROM control algorithm, a sensor system 2 for detecting a critical rollover driving situation, and an actuator 3 for performing a stabilization intervention. If control unit 1 detects a critical rollover situation on the basis of sensor signals, the system intervenes in the driving operation by actuating the brake on the front wheel external to the curve and via the engine torque. Other systems also intervene in the driving operation via an active suspension/shock absorber system (normal force distribution system), for example.

In a known rollover stability system, a critical rollover situation is typically detected by the fact that a variable describing the transverse dynamics of the vehicle (referred to hereinafter as control variable) is monitored for a threshold value. This means that the variable is compared to a characteristic value, and if the threshold is exceeded, a stabilizing intervention is performed. This control variable is typically also used for determining the intensity of the control intervention.

The control variable is usually a function of the transverse acceleration of the vehicle and of the variation of the transverse acceleration over time. The transverse acceleration is usually measured using a transverse acceleration sensor. Activation and de-activation of the ROM rollover stability regulation is thus related to the transverse acceleration of the vehicle. This has the following disadvantages: If the control variable exceeds the predefined threshold value, a more aggressive stabilization intervention is performed as a function of the transverse acceleration. The measured transverse acceleration of the vehicle and thus the control variable are reduced due to the stabilization intervention. If the control variable drops below a predefined de-activation threshold, the stabilization intervention is terminated. If the vehicle continues to be steered aggressively in this situation while traveling at a high velocity, termination of the stabilization intervention results immediately in another critical rollover situation.

SUMMARY OF THE INVENTION

An object of the present invention is therefore to provide a rollover stability method and a corresponding device which make it possible to permanently stabilize a vehicle, so that the vehicle does not immediately return to a critical rollover situation after a stabilization intervention is terminated.

This object is achieved according to the present invention. One important aspect of the present invention is that the stabilization intervention is activated or de-activated as a function of the steering angle and/or the vehicle velocity. This has the advantage that the stabilization intervention is maintained in the case of aggressive steering and, at the same time, high vehicle velocity even if the transverse acceleration assumes low values.

According to a preferred embodiment of the present invention, the stabilization intervention is activated or de-activated as a function of a control variable which (in addition to other variables) is a function of the steering angle and/or the vehicle velocity. The control variable thus represents a "virtual transverse acceleration" which is determined by the driver's intent, i.e., by the steering angle and the vehicle velocity.

A characteristic property of the stability algorithm, such as the activation and de-activation thresholds as a function of the steering angle and/or the vehicle velocity, may also be optionally set, thereby causing the rollover stability function to remain active even in the case of low transverse acceleration but a relatively great steering angle and/or high velocity.

The control variable is a function of the actual (measured) transverse acceleration in addition to the above-mentioned variables. The transverse acceleration may be measured, for example, using a transverse acceleration sensor.

The control variable may, however, also be a function of a calculated transverse acceleration, which is calculated, for example, on the basis of Ackermann's equation. The known Ackermann equation, which is derived from the single-lane model known from the literature, describes the yaw rate as a function of the vehicle velocity and the steering angle. An "Ackermann transverse acceleration" may in turn be calculated from the yaw rate by simply multiplying by the longitudinal velocity of the vehicle.

The control variable may, however, also be a function of the change in the transverse acceleration or of another vehicle-specific parameter such as a steering gradient. The steering gradient is a variable which describes the change in the steering angle.

According to a preferred embodiment of the present invention, a variable (ayAck) which is a function of the steering angle and the vehicle velocity is calculated and used to determine the control variable. This variable (ayAck) is preferably supplied to a buffer device or memory device, whose output signal is taken into account in the calculation of the control variable. The buffer device or memory device temporarily stores the supplied variable. This has the advantage that, in the case of highly dynamic steering maneuvers, such as lane change maneuvers, in which a neutral driving situation featuring a small steering angle and therefore low ayAck variable may also occur, previous high values are not immediately "forgotten" and thus the stabilization intervention continues to be maintained.

The buffer device or memory device according to the present invention, which may be implemented as software or hardware, preferably includes a counter which is set to a predefined value when the supplied variable (ayAck) exceeds a predefined threshold value. If the variable supplied to the counter exceeds a predefined de-activation threshold, the counter starts to count back. The counter content may be weighted using a characteristic curve, for example, and normalized. When the variable exceeds the activation threshold again, the counter is reset. This means that when the variable (ayAck) is only briefly less than the de-activation threshold, the weighted, normalized counter content continues to be used for calculating the control variable. Only when the variable drops below the de-activation threshold for a predefined time period is the instantaneous value of the variable used for computing the control variable. Compared to a previously known rollover stability system, the stabilization intervention is maintained for a longer period as a result of this.

The rollover stability system according to the present invention includes a control unit, in which an appropriate regulating algorithm is stored, a sensor system for detecting the instantaneous actual values of the regulation, and an actuator for performing a stabilization intervention, the regulating algorithm being activated or de-activated as a function of a control variable. According to the present invention, the control variable is a function of the steering angle and/or of the vehicle velocity.

DETAILED DESCRIPTION

Figure 1:
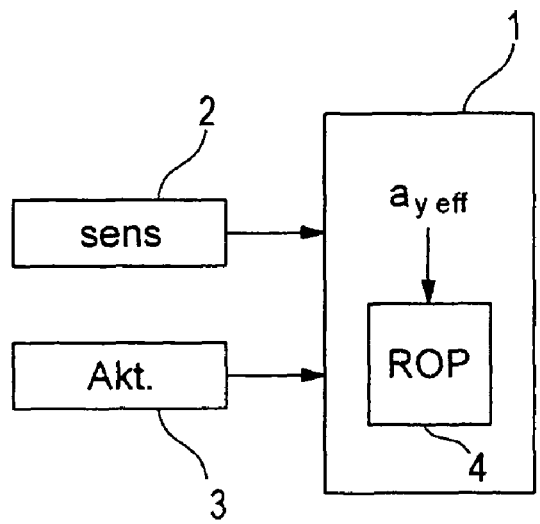
FIG. 1 shows a schematic block diagram of a rollover stability system.

FIG. 1 shows a schematic block diagram of a rollover stability system having a control unit 1, in which a rollover stability algorithm 4, such as ROM (rollover mitigation) is stored, a sensor system 2 for detecting a critical driving situation, and an actuator 3 for performing a stabilization intervention. Sensor system 2 includes the usual sensors of an electronic stability program (ESP), such as wheel speed sensors, a transverse acceleration sensor, a yaw rate sensor, a braking pressure sensor, a steering wheel angle sensor, etc., and is illustrated for the sake of simplicity as one block 2. A brake system of the vehicle or also an active suspension/shock absorber system, for example, may be used as the actuator.

In a critical rollover driving situation, the ROM rollover stability algorithm calculates an adjustment intervention to reduce the transverse acceleration of the vehicle and thus prevent the vehicle from rolling over. The adjustment intervention normally takes place via actuation of the wheel brake on the front wheel on the outside of the curve. This generates a yaw moment which counteracts the yaw movement of the vehicle and thus stabilizes the vehicle. After meeting a predefined stability condition, the regulation intervention is de-activated again.

The stabilization intervention is activated or de-activated as a function of a control variable ayeff, which is in turn a function of transverse acceleration ay of the vehicle. Control variable ayeff is analyzed in the ROM function and monitored for exceeding a threshold value. If control variable ayeff exceeds a predefined activation threshold, the stability regulation is activated; if control variable ayeff drops below a predefined de-activation threshold, the regulation is de-activated and the regulation intervention is thus terminated.

Figure 2:
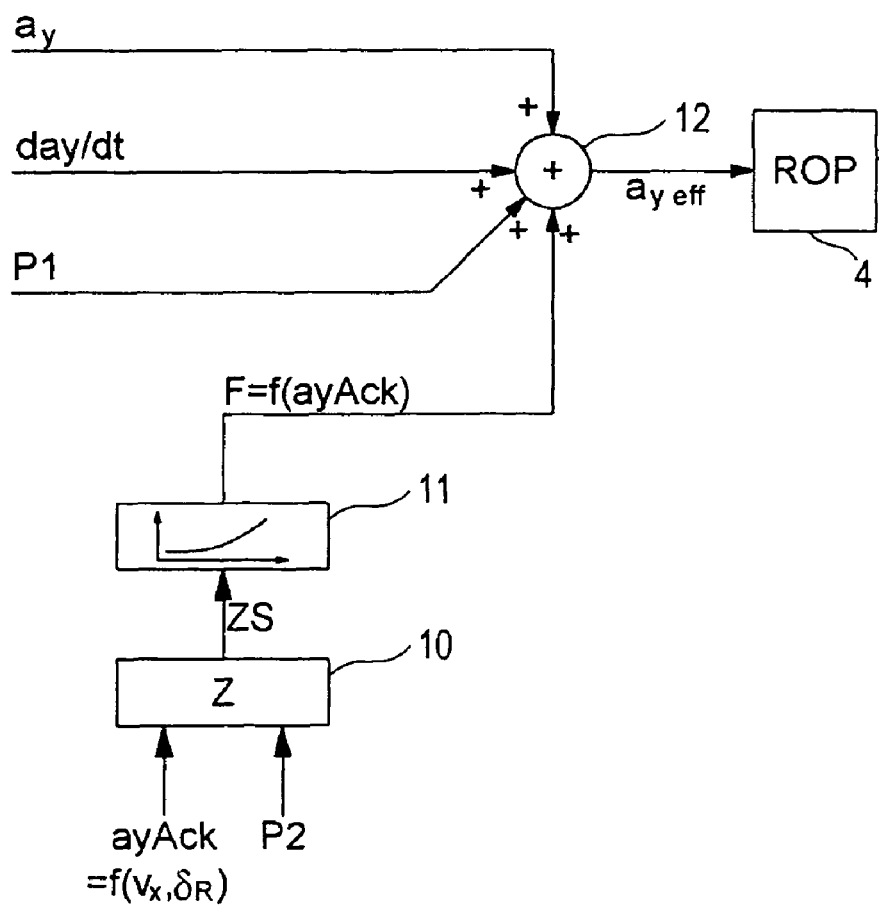
FIG. 2 schematically shows the formation of a control variable ayeff of a rollover stability algorithm.

The exact calculation of control variable ayeff is illustrated in FIG. 2. FIG. 2 schematically shows the different variables which are used for calculating control variable ayeff. The different variables are added up in this case (adding node 12) and control variable ayeff is formed from this sum.

The control variable in this case is a function of transverse acceleration ay of the vehicle, the change in transverse acceleration day/dt, and one or more vehicle-specific parameters P, such as the steering gradient. The steering gradient is the change in the absolute steering angle.

Control variable ayeff is also a function of an additional variable, designated here as variable F, which in turn is a function of steering angle $\delta_R$ and longitudinal vehicle velocity $v_x$. Variable F may be calculated via a suitable vehicle dynamics model, for example. The "single-lane model" known from the literature from which Ackermann's equation is derived is particularly suitable for this purpose. Using the single-lane model, a setpoint yaw rate is calculated according to Ackerman, where the following relationship applies:

$$\frac{d\psi_{So}}{dt} = \frac{\delta_R}{l} \times \frac{v_x}{1 + (v_x/v_{ch})^2}$$

where $\delta_R$ is the steering angle on the front axle, l is the wheelbase, $v_x$ is the longitudinal vehicle velocity, and $v_{ch}$ is a characteristic velocity.

From the single-lane model, an "Ackermann transverse acceleration" may be calculated, where the following relationship applies:

$$ayAck = d\psi_{So}/dt * v_x.$$

Variable ayAck expresses the transverse acceleration which would occur due to the driver's intent, namely steering angle $\delta_R$, the vehicle velocity, and the vehicle parameters when driving in circles at a constant velocity, assuming the applicability of the linear single-lane model.

Variable ayAck might be used, possibly normalized and limited to a predefined range of values, directly in the calculation of control variable ayeff, for example, and added to the other variables in node 12, for example. It is, however, more advantageous to supply virtual transverse acceleration ayAck to a buffer circuit or memory circuit 10, 11, which does not immediately "forget" the previous high values of ayAck, in particular in the case of highly dynamic steering maneuvers (e.g., lane change maneuvers) in which neutral phases featuring low transverse acceleration and a neutral steering wheel position, and thus low ayAck values, occur. Without this memory circuit 10, 11, the stabilization intervention would be immediately aborted in the event of low ayAck values, which is not desirable in the case of highly dynamic maneuvers.

In the illustrated exemplary embodiment, the buffer device or memory device includes a counter 10 implemented in the software, which receives virtual transverse acceleration ayAck and an additional vehicle-specific parameter P2. The parameter is a steering gradient P2, for example. If both input variables ayAck and P2 exceed the predefined threshold values, counter 10 is set to a predefined counter content ZS. In a driving phase in which variable ayAck or parameter P drops below a predefined de-activation value, the counter starts counting backward. Counter content ZS may be weighted and resized using a characteristic curve 11. Resulting value F is used in calculating control variable ayeff and is added to other variables ay, day/dt, and P in node 12. Characteristic curve 11 is preferably a non-linear characteristic curve.

When the variable exceeds the activation threshold again due to the steering behavior of the driver, counter 10 is reset. The value of control variable ayeff changes only slightly and stability intervention 4 is maintained. As long as the activation threshold is no longer exceeded, counter 10 counts backward again, variable F being reduced according to the counter content (weighted using characteristic curve 11). When value F and thus control variable ayeff drop below a predefined threshold value, stability regulation 4 is terminated.

The above-described buffer device 10, 11 thus makes it possible to maintain the stabilization intervention even during brief neutral driving situations in highly dynamic maneuvers.

List of Reference Numerals

1 control unit
2 sensor system
3 actuator system
4 stability regulation algorithm
10 counter
11 characteristic curve
12 adding node
$a_{yeff}$ control variable
$a_y$ measured transverse acceleration
$da_y/dt$ change in transverse acceleration
P1, P2 parameter
$a_{yAck}$ virtual transverse acceleration
ZS counter content
F additional contribution to control variable
$\delta_R$ steering angle
$v_x$ vehicle velocity

What is claimed is:

1. A method for rollover stabilization of a vehicle in critical driving situations, the method comprising:
    performing a stability algorithm, the stability algorithm using a sensor system to detect a critical rollover driving situation and using an actuator to intervene in a driving operation and stabilize the vehicle in a critical rollover driving situation for the vehicle;
    one of activating and deactivating regulation intervention as a function of a control variable, wherein the control variable is calculated as a function of a measured transverse acceleration and a first variable which is a function of the steering angle and the longitudinal vehicle velocity, the first variable being supplied to one of a buffer device and a memory device, wherein the one of the buffer device and the memory device includes a counter whose output signal is weighted using a characteristic curve and used in calculating the control variable;
    setting the counter to a predefined counter value when the first variable exceeds a first threshold value; and
    after setting the counter to the predefined counter value, causing the counter to count backwards from the predefined counter value when the first variable drops below a second threshold value.

2. The method according to claim 1, wherein the control variable is also a function of at least one of (a) a change in a transverse acceleration and (b) another parameter characterizing a driving response of the vehicle.

3. The method according to claim 1, wherein the first variable is computed on the basis of Ackermann's equation.

4. The method according to claim 1, further comprising:
    resetting the counter to the first counter value when the counter is counting towards the second counter value and the second variable again exceeds the first threshold value.

5. The method according to claim 1, further comprising:
    calculating the control variable as a sum of the measured transverse acceleration and the weighted output signal of the counter.

6. A method for rollover stabilization of a vehicle in critical driving situations, the method comprising:
    calculating a first variable as a function of a steering angle and a longitudinal vehicle velocity;
    setting a current value of a counter to a predefined counter value whenever the first variable exceeds a first threshold;
    after setting the current value to the predefined counter value, causing the counter to count backwards from the predefined counter value when the first variable drops below a second threshold;
    calculating a control variable as a function of the current counter value and a measured transverse acceleration; and
    performing a stability intervention by using an actuator to intervene in a driving operation and stabilize the vehicle in a critical rollover driving situation for the vehicle, wherein the performing of the stability intervention is conditioned upon the control variable exceeding a predefined activation threshold.

* * * * *